United States Patent
Zoellner (10) Patent No.: US 6,994,379 B2
(45) Date of Patent: Feb. 7, 2006

(54) TUBULAR ASSEMBLY HAVING AN INTERNAL PLUG

(75) Inventor: Olaf J. Zoellner, Leverkusen (DE)

(73) Assignee: LANXESS Corporation, Pittsburgh, PA (US)

( * ) Notice: Subject to any disclaimer, the term of this patent is extended or adjusted under 35 U.S.C. 154(b) by 164 days.

(21) Appl. No.: 10/406,537

(22) Filed: Apr. 3, 2003

(65) Prior Publication Data

US 2004/0195833 A1 Oct. 7, 2004

(51) Int. Cl.
*F16L 13/00* (2006.01)

(52) U.S. Cl. .................... 285/285.1; 285/423; 403/202; 403/220; 29/530

(58) Field of Classification Search ............. 285/285.1, 285/423; 403/202, 203, 206, 207, 210, 220, 403/221, 225; 29/530
See application file for complete search history.

(56) References Cited

U.S. PATENT DOCUMENTS

| | | | | |
|---|---|---|---|---|
| 51,910 A | * | 1/1866 | Barbarour | 285/404 |
| 339,036 A | * | 3/1886 | Wilbur | 285/294.3 |
| 1,344,221 A | | 6/1920 | Burns | |
| 1,863,370 A | * | 6/1932 | Geyer | 267/141.4 |
| 2,080,627 A | * | 5/1937 | Morgan | 464/87 |
| 2,260,038 A | * | 10/1941 | Lang | 285/7 |
| 2,539,229 A | * | 1/1951 | Colburn | 403/220 |
| 2,587,822 A | * | 3/1952 | Corning | 403/220 |
| 3,169,403 A | * | 2/1965 | McGinn | 73/864.63 |
| 3,263,198 A | | 7/1966 | Rothweller | |
| 3,731,710 A | * | 5/1973 | Bauer et al. | 138/143 |
| 3,920,268 A | * | 11/1975 | Stewing | 285/21.1 |
| 3,949,461 A | * | 4/1976 | Thastrup | 29/460 |
| 4,049,480 A | * | 9/1977 | Kutschke | 156/94 |
| 4,363,505 A | * | 12/1982 | Smith | 285/369 |
| 4,541,649 A | | 9/1985 | Grunfeld | |
| 4,645,557 A | * | 2/1987 | Pedersen | 156/250 |
| 4,998,337 A | | 3/1991 | Tiekink | |
| 5,190,803 A | | 3/1993 | Goldbach et al. | |
| 5,275,679 A | * | 1/1994 | Rojek | 156/250 |
| 5,318,819 A | * | 6/1994 | Pai | 428/71 |
| 5,404,630 A | | 4/1995 | Wu | |
| 5,439,724 A | * | 8/1995 | Rojek | 428/66.3 |
| 5,486,024 A | * | 1/1996 | Dierdorf | 285/294.3 |
| 5,568,949 A | * | 10/1996 | Andre | 285/285.1 |
| 5,797,613 A | | 8/1998 | Busby | |
| 5,842,265 A | | 12/1998 | Rink | |

(Continued)

FOREIGN PATENT DOCUMENTS

| | | |
|---|---|---|
| DE | 33 24 831 | 3/1984 |
| DE | 88 11 106.7 | 1/1989 |
| FR | 1403307 | 12/1965 |
| FR | 2072357 | 9/1971 |
| GB | 688923 | 3/1953 |

*Primary Examiner*—James M. Hewitt
(74) *Attorney, Agent, or Firm*—Jill Denesvich; Godfried R. Akorli (57) ABSTRACT

A tubular assembly that includes a plug (45) residing within at least a portion of each of a first tube (12) and a second tube (30), is described. Each of the first and second tubes have perforations (21 and 39) that are separately aligned with cavities (51) in the exterior surface (48) of the plug (45). Plastic material (54) is molded separately through the perforations (21 and 39) of the first and second tubes (12 and 30) and at least partially fills the cavities (51) of the plug (45). The edges (24) of the perforations (21) of the first tube (12), and the edges (42) of the perforations (39) of the second tube (30) are embedded in the plastic material (54) extending therethrough, thereby fixedly attaching the first and second tubes to the plug therein.

13 Claims, 8 Drawing Sheets

U.S. PATENT DOCUMENTS

| | | |
|---|---|---|
| 5,865,456 A | 2/1999 | Busby et al. |
| 5,924,906 A | 7/1999 | Grafton |
| 5,937,496 A | 8/1999 | Benoit et al. |
| 5,940,949 A | 8/1999 | Rink |
| 5,988,696 A | 11/1999 | Ruppert |
| 6,003,906 A * | 12/1999 | Fogarty et al. ............. 285/242 |
| 6,070,915 A | 6/2000 | Luo |
| 6,092,823 A * | 7/2000 | Busby ........................ 280/284 |
| 6,402,201 B1 * | 6/2002 | Pool et al. .................... 285/47 |
| 6,426,031 B1 | 7/2002 | Hayes, Jr. |
| 6,595,559 B1 * | 7/2003 | Readman ................... 285/382 |

* cited by examiner

TUBULAR ASSEMBLY HAVING AN INTERNAL PLUG

FIELD OF THE INVENTION

The present invention relates to a tubular assembly that includes a plug residing within each of a first tube and a second tube. Each of the first and second tubes have a plurality perforations having edges, and the exterior surface of the plug has a plurality of cavities therein. At least some of the cavities of the plug are separately aligned with the perforations of each of the first and second tubes. The tubular assembly is prepared by molding plastic material (e.g., thermoplastic material) through the perforations of the first and second tubes and into the cavities aligned therewith. The edges of the perforations become embedded in the plastic material extending therethrough, thereby fixedly attaching the first and second tubes to the plug.

BACKGROUND OF THE INVENTION

Tubular frames are often used in support structures for the purpose of providing a combination of desirable physical properties, such as rigidity and stability, with a reduction in weight, relative to solid or more solid support structures. Support structures that make use of tubular frames include, for example, chairs (e.g., aircraft and automotive seats), wheel chairs, aircraft and automotive space frames, and motorcycle and bicycle frames.

Tubular frames typically include a plurality of tubular members that are assembled together by means including, for example, welding, brazing, soldering, crimping, gluing, and/or screwing the ends of the tubular members together. In addition, fasteners, such as rivets, may be used to join the ends of the tubular members together. The weakest point of a tubular frame is typically the point where the ends of the tubular members are connected together. When placed under load (e.g., cyclical loading): welds, brazings and solder points can crack; crimped and screwed tube ends can come undone; and adhesives and fasteners can fail, e.g., crack or shear.

It would be desirable to develop tubular assemblies that provide a combination of desirable physical properties, such as strength and rigidity, with light weight. In addition, it would be desirable that such newly developed tubular assemblies have tubular connection points that have improved resistance to failure under load.

U.S. Pat. Nos. 5,797,613 and 5,865,456 disclose a flex joint for a vehicle frame (e.g., a bicycle frame). The flex joint includes a flexible member of durable material (e.g., a metal plate), an encasement surrounding the flexible member (e.g., of nylon), and bores through ends of the flex joint. The ends of the flex joint of the '613/'456 patent are disclosed as being inserted within a circular frame end having openings (e.g., openings 119). Shoulder pins are disclosed as being inserted into the bores of the flex joint through the openings in the circular frame ends.

U.S. Pat. No. 4,541,649 discloses a connection between at least one first tube and a second tube of a bicycle frame. The first tube of the connection of the '649 patent has a flared terminus that is in engagement with the outer surface of the second tube. An injection-molded one-piece plastic casing fully surrounds the end portion of the first tube and fully surrounds a circumferential portion of the outer surface of the second tube in the zone of the engagement of the flared terminus of the first tube with the second tube.

U.S. Pat. No. 5,937,496 discloses plastic connection elements (having recesses) for tubular frames. The plastic connection elements of the '496 patent are inserted within a hollow end of a tubular element, and the tubular element is deformed relative to the recesses of the plastic connection element, thus forming a tight fit there between.

U.S. Pat. No. 5,404,630 discloses a method of joining a frame tube to a lug. The method of the '630 patent includes: forming through-holes in the lug; inserting a frame tube into the lug; deforming the frame tube such that outward projections are formed therefrom that engage the through-holes in the lug; placing a reinforcing tube within the frame tube; and deforming the reinforcing tube such that outward projections are formed therefrom that engage with the inside wall of the frame tube.

SUMMARY OF THE INVENTION

In accordance with the present invention, there is provided a tubular assembly comprising:

(a) a first tube having interior and exterior surfaces and a plurality of perforations having edges;

(b) a second tube having interior and exterior surfaces and a plurality of perforations having edges; and (c) a plug residing within at least a portion of each of said first and second tubes, said plug having an exterior surface, said exterior surface having cavities therein, at least some of said cavities being separately aligned with the perforations of said first tube and the perforations of said second tube, wherein said tubular assembly is prepared by a process comprising molding plastic material through at least some of the perforations of said first tube into the cavities aligned therewith, and through at least some of the perforations of said second tube into the cavities aligned therewith, the edges of the perforations of said first and second tubes being embedded in the plastic material extending therethrough thereby fixedly attaching said first tube and said second tube to said plug.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings.

Unless otherwise indicated, all numbers or expressions, such as those expressing structural dimensions, process conditions, etc. used in the specification and claims are understood as modified in all instances by the term "about."

BRIEF DESCRIPTION OF THE DRAWINGS

In FIGS. 1 through 8, like reference numerals and characters designate the same components and structural features.

DETAILED DESCRIPTION OF THE INVENTION

Figure 1:
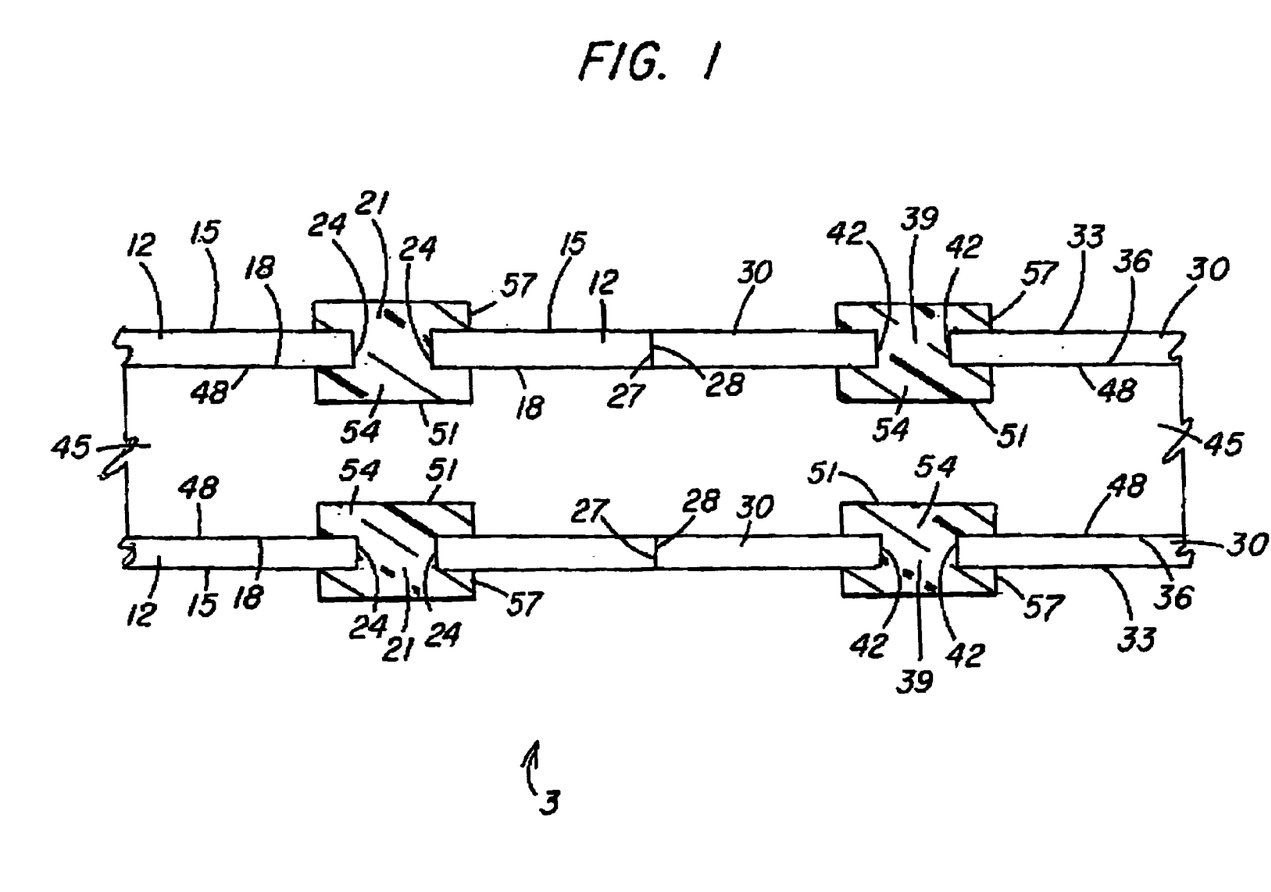
FIG. 1 is a representative sectional view of a tubular assembly according to the present invention.

Referring now to FIG. 1 of the drawing figures, there is shown a representative sectional view of a portion of a tubular assembly 3 according to the present invention, which includes a first tube 12 and a second tube 30, each of which is separately superposed over a plug 45. First tube 12 has interior surfaces 18, exterior surfaces 15, a perforation 21 having (that is defined by) edges 24, and a terminal end 27 that is superposed over plug 45. Second tube 30 has interior surfaces 36, exterior surfaces 33, a perforation 39 having (this is defined by) edges 42, and a terminal end 28 that is superposed over plug 45. Terminal end 27 of first tube 12 abuts terminal end 28 of second tube 30.

Plug 45 resides within at least a portion of each of first tube 12 and second tube 30. The exterior surface 48 of plug 45 has cavities 51 therein that are separately aligned with perforations 21 of first tube 12, and perforations 39 of second tube 30. Plastic material 54 is molded through perforations 21 and 39 of first tube 12 and second tube 30, and fills perforations 51 that are aligned therewith. The plastic material 54 extending through perforations 21 and 39 and filling cavities 51, embeds edges 24 and 39 of the perforations therein, thereby fixedly attaching first tube 12 and second tube 30 to plug 45.

Plug 45, residing within and extending between the interiors of both first plug 12 and second plug 30, is preferably substantially continuous. Plug 45 may be selected from substantially cylindrical plugs, substantially elliptical plugs, polygonal plugs (e.g., square plugs, rectangular plugs, pentagonal plugs, hexagonal plugs, heptagonal plugs, octagonal plugs, etc.), and combinations thereof (e.g., a plug having a substantially cylindrical portion and polygonal terminal portions). Preferably, plug 45 is selected from substantially cylindrical plugs.

First tube 12, and second tube 30 may each independently be selected from, for example, substantially cylindrical tubes, substantially elliptical tubes, polygonal tubes (e.g., square tubes, rectangular tubes, pentagonal tubes, hexagonal tubes, heptagonal tubes, octagonal tubes, etc.), and combinations thereof (e.g., tubes having substantially cylindrical terminal portions connected by means of a polygonal tubular section). Preferably, first tube 12 and second tube 30 are each selected from substantially cylindrical tubes.

Perforations 21 of first tube 12 and perforations 39 of second tube 30 are each separately aligned with perforations 51 of plug 45. As used herein and in the claims, the term "aligned" as used with regard to the cavities (e.g., cavities 51) that are aligned with the perforations of the first and second tubes is meant to be inclusive of those cavities that are partially aligned with the perforations, and those that are substantially aligned with the perforations (e.g., cavities that are substantially coaxially aligned with the perforations).

Cavities 51 of plug 45 typically are of (or have) larger dimensions (e.g., cross sectional dimensions) than the dimensions of perforations 21 and 39 (and accordingly, perforations 21 and 39 each are of smaller dimension than cavities 54). For example, when perforations 21 and 39 and cavities 51 each have a substantially circular cross section, the diameters of cavities 51 are larger than the diameters of perforations 21 and 39.

At least a portion of the exterior surfaces 48 of plug 45 abut a portion of the inner surfaces 18 of first tube 12 and the inner surfaces 36 of second tube 30. In an embodiment of the present invention, the inner surfaces 18 of first tube 12 and the inner surfaces 36 of second tube 30 have raised portions (e.g., bumps and/or ribs) that abut exterior surface 48 of plug 45. Alternatively, or in addition thereto, the exterior surface 48 of plug 45 has raised portions (e.g., bumps and/or ribs) that abut interior surfaces 18 of first tube 12 and/or the interior surfaces 36 of second tube 30. Preferably, exterior surfaces 48 of plug 45 are in substantially continuous abutting relationship with at least a portion of the inner surfaces 18 of first tube 12 and the inner surfaces 36 of second tube 30.

The tubular assembly of the present invention is prepared by means of molding plastic material 54 separately through perforations 21 and 39 of first and second tubes 12 and 21, and into cavities 51 of plug 45 that are separately aligned with perforations 21 and 39. The molded plastic material 54 at least partially fills, and preferably totally fills cavities 51 of plug 45. In addition, edges 24 of perforations 21 and edges 42 of perforations 39 are embedded in the plastic material 54 molded therethrough. The plastic material 54 embedding edges 24 and 42 of perforations 21 and 39 is continuous with the plastic material 54 that at least partially fills cavities 51 of plug 45, and thus serves to fixedly attach first tube 12, and second tube 30 to plug 45.

As used herein and in the claims, the term "molding plastic material" and similar terms, such as "molded on" relative to introducing plastic material through the perforations and into the cavities aligned therewith, is inclusive of: (i) processes that involve the use of a mold (e.g., injection molding and reaction injection molding); and (ii) processes that do not involve the use of a mold. Processes that do not involve the use of a mold include, for example, pouring molten thermoplastic material (or a liquid thermosetting plastic composition) through the perforations and into the aligned cavities.

Tubular assemblies according to the present invention can provide improvements over prior tubular assemblies, as discussed previously herein. For example, when under load (e.g., cyclical loads) failure between plastic material 54 and edges 24 and 42 of perforations 21 and 39 embedded therein is less likely to occur, due in part to the tight and continuous fit there between. In addition, plug 45 serves to increase the strength and resiliency of the tubular assemblies according to the present invention. For example, when the tubular assembly is under load, plug 45 stabilizes plastic embedded perforation edges 24 and 42 by supporting first tube 12 and second tube 30 from the inside, and absorbing stresses that would otherwise be born alone by plastic embedded perforation edges 24 and 42.

In an embodiment of the present invention, the plastic material extending through the perforations of the first tube and into the cavities aligned therewith is continuous with molded on attachment heads of plastic material on the exterior surface of the first tube. Alternatively, or in addition thereto, the plastic material extending through the perforations of the second tube and into the cavities aligned therewith is continuous with molded on attachment heads of plastic material on the exterior surface of the second tube.

With further reference to FIG. 1, the plastic material 54 extending through perforation 21 of first tube 12 is continuous with an attachment head 57 of plastic material on exterior surface 15 of first tube 12. In addition, the plastic material 54 extending through perforations 39 of second tube 30 is continuous with an attachment head 57 of plastic material on exterior surface 33 of second tube 30. Attachment heads 57 in conjunction with the plastic material 54 filling cavities 51, serves to further embed and fixedly hold edges 21 and 42 of perforations 21 and 39 in the plastic material 54 extending therethrough.

The plastic material extending through perforations 21 of first tube 12 and into the cavities 51 aligned therewith is continuous with molded on plastic material encasing at least a portion of exterior surface 15 of first tube 12, in an embodiment of the present invention. Alternatively, or in addition thereto, the plastic material 54 extending through perforations 39 of second tube 30 and into the cavities 51 aligned therewith is continuous with molded on plastic material encasing at least a portion of the exterior surface 33 of second tube 30. With reference to FIG. 1, plastic material 57 on the exterior surfaces 15 and 33 of first tube 12 and second tube 30, in addition to representing attachment heads, also represents annular rings of molded on plastic material that encases a portion of the exterior surfaces of the tubes.

Encasing at least a portion of the exterior surfaces 15 and/or 33 of first tube 12 and/or second tube 30 protects such exterior surfaces from, for example, impacts and corrosion. The exterior surface encasing plastic material may optionally have a textured surface (not shown) that improves gripping of such surfaces by, for example, a human hand.

Figure 4:
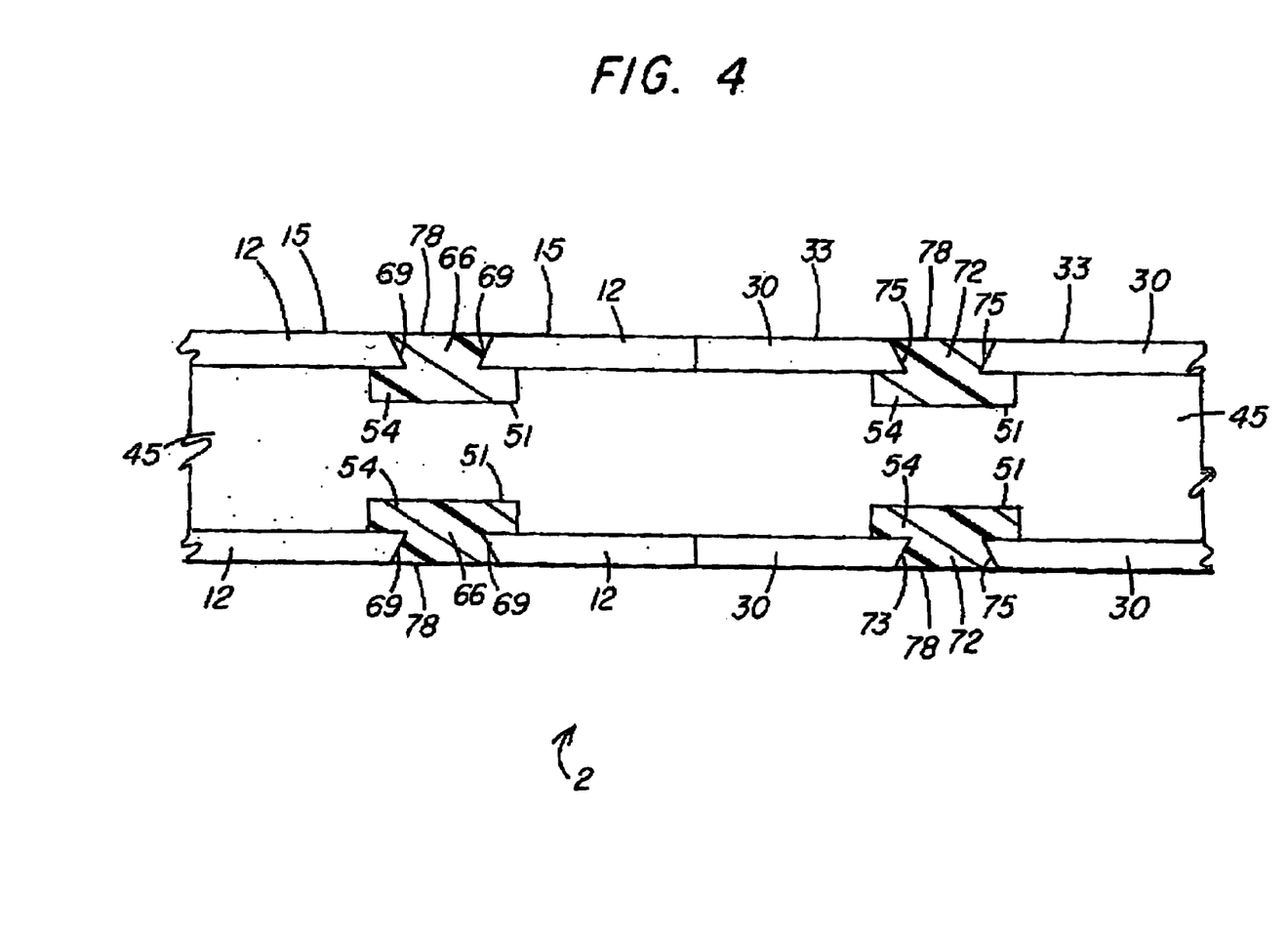
FIG. 4 is a representative sectional view of a tubular assembly similar to that of FIG. 1, in which the perforations of the tubes have deformed edge portions.

At least some of the perforations of the first and/or second tubes may have deformed edge portions, in an embodiment of the present invention. With reference to FIG. 4, a sectional view of a portion a tubular assembly 2 according to the present invention is depicted. First tube 12 has perforations 66 that are defined by deformed edge portions 69, and second tube 30 had perforations 72 that are defined by deformed edge portions 75. Edge portions 69 and 75 are embedded in the plastic material 54 extending therethrough and into cavities 51 of plug 45. The plastic material 54 extending through perforations 66 and 72 (and filling cavities 51) is continuous with attachment heads 78, which are each substantially flush with exterior surface 15 of first tube 12 and exterior surface 33 of second tube 30.

The deformed edge portions of the perforations of the tubular assemblies according to the present invention may have numerous configurations. The deformed edge portions may have configurations selected from, for example, beveled configurations (e.g., as depicted in FIG. 4), and bent configurations.

Tubular assemblies according to the present invention are typically prepared by inserting plug 45 into at least a portion of each of first tube 12 and second tube 30, such that cavities 51 are aligned with perforations 21 and 39 of the first and second tubes 12 and 30. At least a portion of the tubular assembly may be placed in a mold, and plastic material is injected through perforations 21 and 39 into cavities 51 that are aligned therewith. The injected plastic material 54 at least partially fills cavities 51 and embeds the edges 24 and 42 of perforations 21 and 39 therein. Attachment heads 57 can be formed by means of depressions in the interior walls of the mold that are positioned over perforations 21 and 39. The injected plastic material 54 is allowed to cool and/or react, and that portion of the tubular assembly is removed from the mold.

Encasing plastic material is typically molded onto exterior surfaces 15 and/or 33 of first tube 12 and/or second tube 30 concurrently with the injection of plastic material 54 into cavities 51. Alternatively, encasing plastic material may be molded onto exterior surfaces 15 and/or 33 after the injection of plastic material 54 into cavities 51. While encasing plastic material molded onto the exterior surfaces 15 and/or 33 and plastic material 54 may be different, they are typically the same.

The plastic material (i) molded through perforations 21 and 39, and injected into cavities 51, and/or (ii) molded onto exterior surfaces 15 and/or 33 of first tube 12 and/or second tube 30 may be selected independently from thermoset plastic materials and/or thermoplastic materials.

As used herein and in the claims the term "thermoset plastic material" and similar terms means plastic materials having a three dimensional crosslinked network resulting from the formation of covalent bonds between chemically reactive groups, e.g., active hydrogen groups and free isocyanate groups. Thermoset plastic materials that may be injected into cavities 51 include those known to the skilled artisan, e.g., crosslinked polyurethanes, crosslinked polyepoxides and crosslinked polyesters. Of the thermoset plastic materials, crosslinked polyurethanes are preferred. Thermoset plastic materials may be injected into cavities 51 and/or onto exterior surfaces 15 and/or 33 of first tube 12 and/or second tube 30 by means of the art-recognized process of reaction injection molding. Reaction injection molding of a polyurethane, for example, typically involves, as is known to the skilled artisan, injecting separately, and preferably simultaneously, into cavities 51: (i) an active hydrogen functional component (e.g., a polyol and/or polyamine); and (ii) an isocyanate functional component (e.g., a diisocyanate such as toluene diisocyanate, and/or dimers and trimers of a diisocyanate such as toluene diisocyanate). The mold into which the reactive components are injected may optionally be heated to ensure and/or hasten complete reaction of the injected components. Upon complete reaction of the injected components, the mold is opened and the tubular assembly according to the present invention is removed.

As used herein and in the claims, the term "thermoplastic material" means a plastic material that has a softening or melting point, and is substantially free of a three dimensional crosslinked network resulting from the formation of covalent bonds between chemically reactive groups, e.g., active hydrogen groups and free isocyanate groups. Examples of thermoplastic materials that may be injected into cavities 51 include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene and mixtures or thermoplastic compositions containing one or more thereof. Of the thermoplastic materials that may be injected into cavities 51, thermoplastic polyamides are preferred. Thermoplastic material may be injected into cavities 51 and/or onto exterior surfaces 15 and/or 33 of first tube 12 and/or second tube 30 by the art-recognized process of injection molding, in which a molten stream of thermoplastic material, e.g., molten thermoplastic polyamide, is injected into a mold, e.g., an optionally heated mold. Upon cooling the filled mold, the tubular assembly is removed. A preferred thermoplastic material that may be injected into cavities 51 and/or onto exterior surfaces 15 and/or 33 of first tube 12 and/or second tube 30 is thermoplastic polyamide, e.g., DURETHAN thermoplastic polyamide, commercially available from Bayer Polymers LLC.

The thermoset plastic materials and/or thermoplastic materials injected into cavities 51 and/or onto exterior surfaces 15 and/or 33 of first tube 12 and/or second tube 30, may optionally be reinforced with a material selected from glass fibers, carbon fibers, metal fibers, polyamide fibers and mixtures thereof. The reinforcing fibers, and the glass fibers in particular, may have sizings on their surfaces to improve miscibility and/or adhesion to the plastics into which they are incorporated, as is known to the skilled artisan. Glass fibers are a preferred reinforcing material in the present invention. If used, the reinforcement material, e.g., glass fibers, is typically present in the thermoset plastic materials and/or thermoplastic materials, injected into cavities 51 and/or onto exterior surfaces 15 and/or 33 of first tube 12 and/or second tube 30, in a reinforcing amount, e.g., in an amount of from 5 percent by weight to 60 percent by weight, based on the total weight of the plastic material injected/molded on.

The thermoset plastic materials and/or thermoplastic materials injected into cavities 51 and/or onto exterior surfaces 15 and/or 33 of first tube 12 and/or second tube 30, may further optionally contain one or more functional additives. Additives that may be present in the injected plastic material include, but are not limited to, antioxidants, colorants, e.g., pigments and/or dyes, mold release agents, fillers, e.g., calcium carbonate, ultraviolet light absorbers, fire retardants and mixtures thereof. Additives may be present in the injected plastic material in functionally sufficient amounts, e.g., in amounts independently from 0.1 percent by weight to 10 percent by weight, based on the total weight of the plastic material injected.

First tube 12, second tube 30 and plug 45 may each independently be fabricated from a material selected from metal, thermoplastic material, thermosetting material and combinations thereof. Metals that may be used include, but are not limited to, iron, aluminum, steel, stainless steel, titanium and combinations thereof. Thermoplastic and thermoset plastic materials that may be used include those examples as recited previously herein. In addition, the thermoset and/or thermoplastic materials from which first tube 12, second tube 30 and plug 45 may be fabricated may optionally contain functional additives (e.g., as recited previously herein) and/or be reinforced with a material selected from, for example, glass fibers, carbon fibers, metal fibers, polyamide fibers and mixtures thereof. Reinforcing materials may be used in amounts as recited previously herein. Functional additives may be present in amounts as recited previously herein. In a preferred embodiment, first tube 12 and second tube 30 are each independently fabricated from metal, and plug 45 is fabricated from a material selected from thermoplastic material and/or thermosetting plastic material.

The plug of the tubular assembly may be a substantially solid plug. When fabricated from a thermoset plastic material and/or thermoplastic material, the plug (e.g., plug 45) may be in the form of a foam, in which case it contains numerous voids. Plug 45 may be fabricated from an elastomeric polymeric material, such as, thermoplastic vulcanizates (e.g., KRATON polymers, commercially available from GLS Corporation) or thermoplastic polyurethanes (e.g., TEXIN thermoplastic polyurethane or DESMOPAN thermoplastic polyurethane, which are commercially available from Bayer Polymers LLC). In an embodiment, the plug is substantially free of encased inserts, such as plates and/or rods (e.g., metal plates and/or metal rods).

Figure 7:
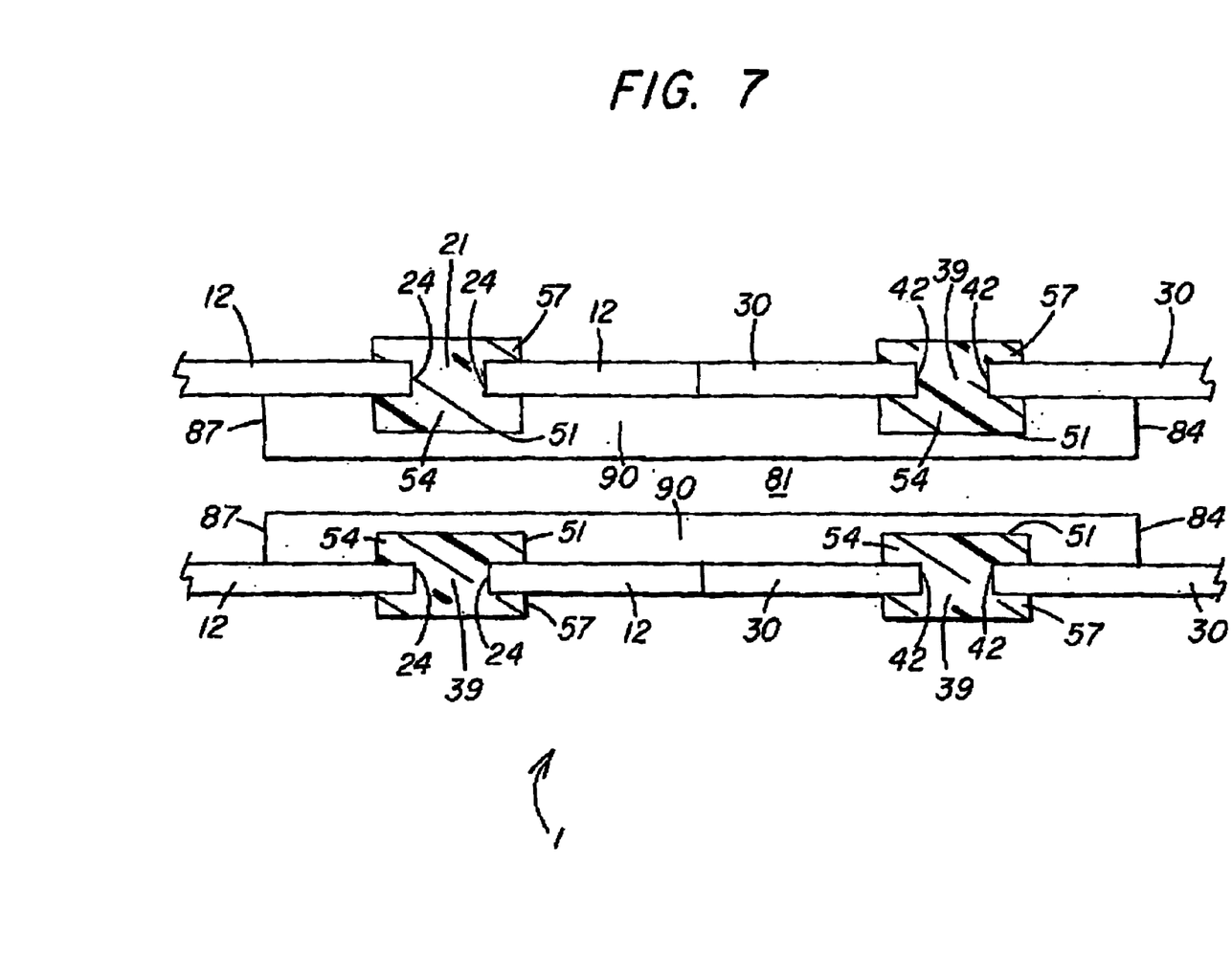
FIG. 7 is a representative sectional view of a tubular assembly similar to that of FIG. 1, in which the plug includes a passage providing fluid communication between the two ends of the plug.

The plug of the tubular assembly may optionally include at least one passage that provides fluid communication between the two ends of the plug. With reference to FIG. 7 a portion of a sectional view of a tubular assembly 1 according to the present invention includes a passage 81 that provides fluid communication between ends 84 and 87 of plug 90. Passage 81 can allow the passage of fluids, such as gasses and/or liquids between the interiors of the connected tubes. Allowing the passage of fluids through and between the interiors of the connected tubes is desirable if the tubular assembly is to be used, at least in part, as a conduit for such fluids. In addition, passage 81 can serve to reduce the buildup of pressure in one tube relative to another tube, if the tubes are exposed to elevated temperatures.

Figure 2:
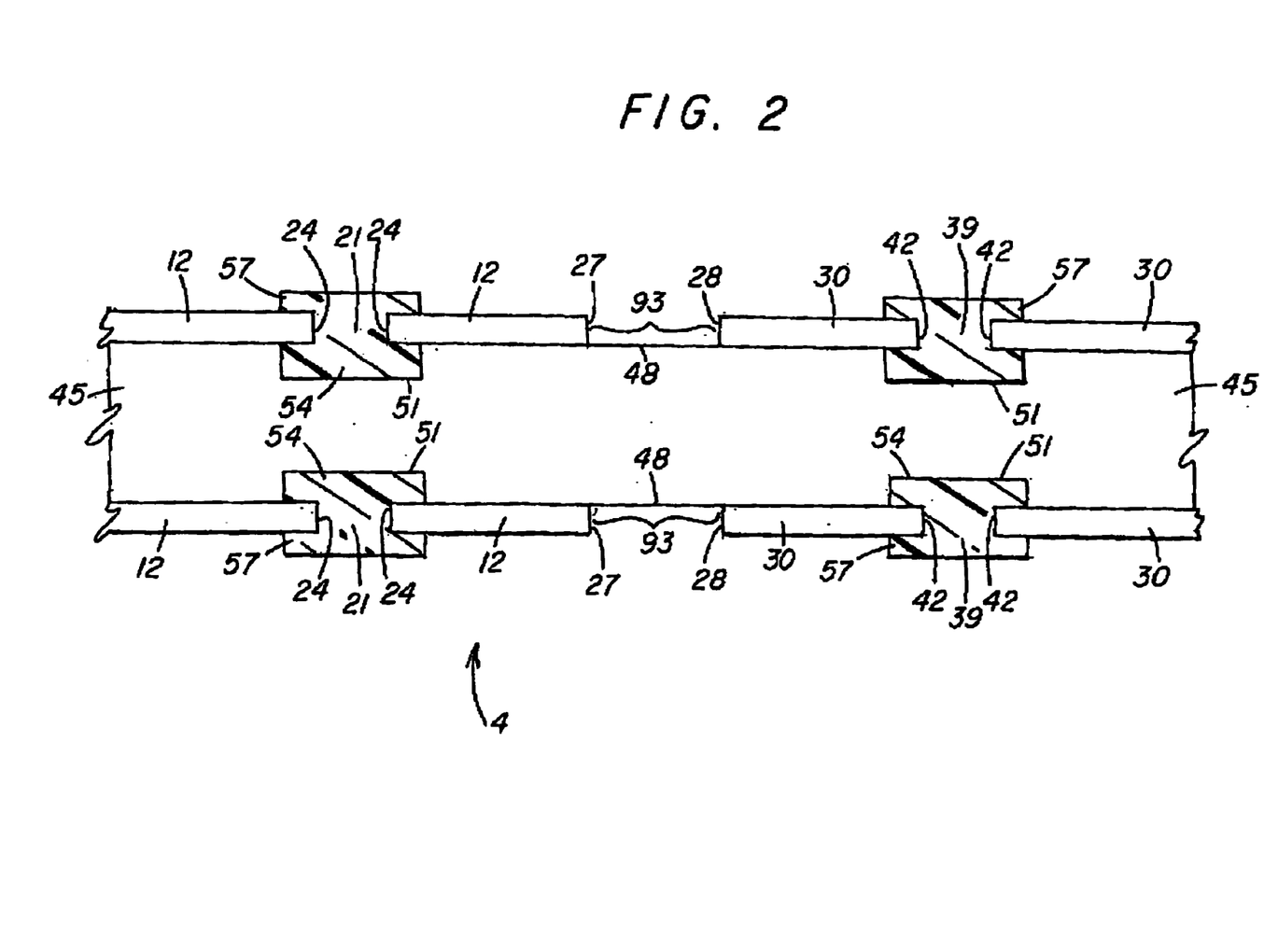
FIG. 2 is a representative sectional view of a tubular assembly according to the present invention in which the terminal ends of the tubes that are superposed over the plug are separated one from the other.

In an embodiment of the present invention, the terminal ends of the first and second tubes that are each superposed over the plug, are separated one from the other. With reference to FIG. 2, there is depicted a sectional view of a portion of a tubular assembly 4, in which terminal end 27 of first tube 12 and terminal end 28 of second tube 30, which are each superposed over plug 45, are separated one from the other. Between separated terminal tube ends 27 and 28 of tubes 12 and 30, a portion 93 of exterior surface 48 of plug 45 is exposed. Terminal ends 27 and 28 may be further described as those terminal ends of tubes 12 and 30 that are superposed over plug 45 and which face each other.

Figure 3:
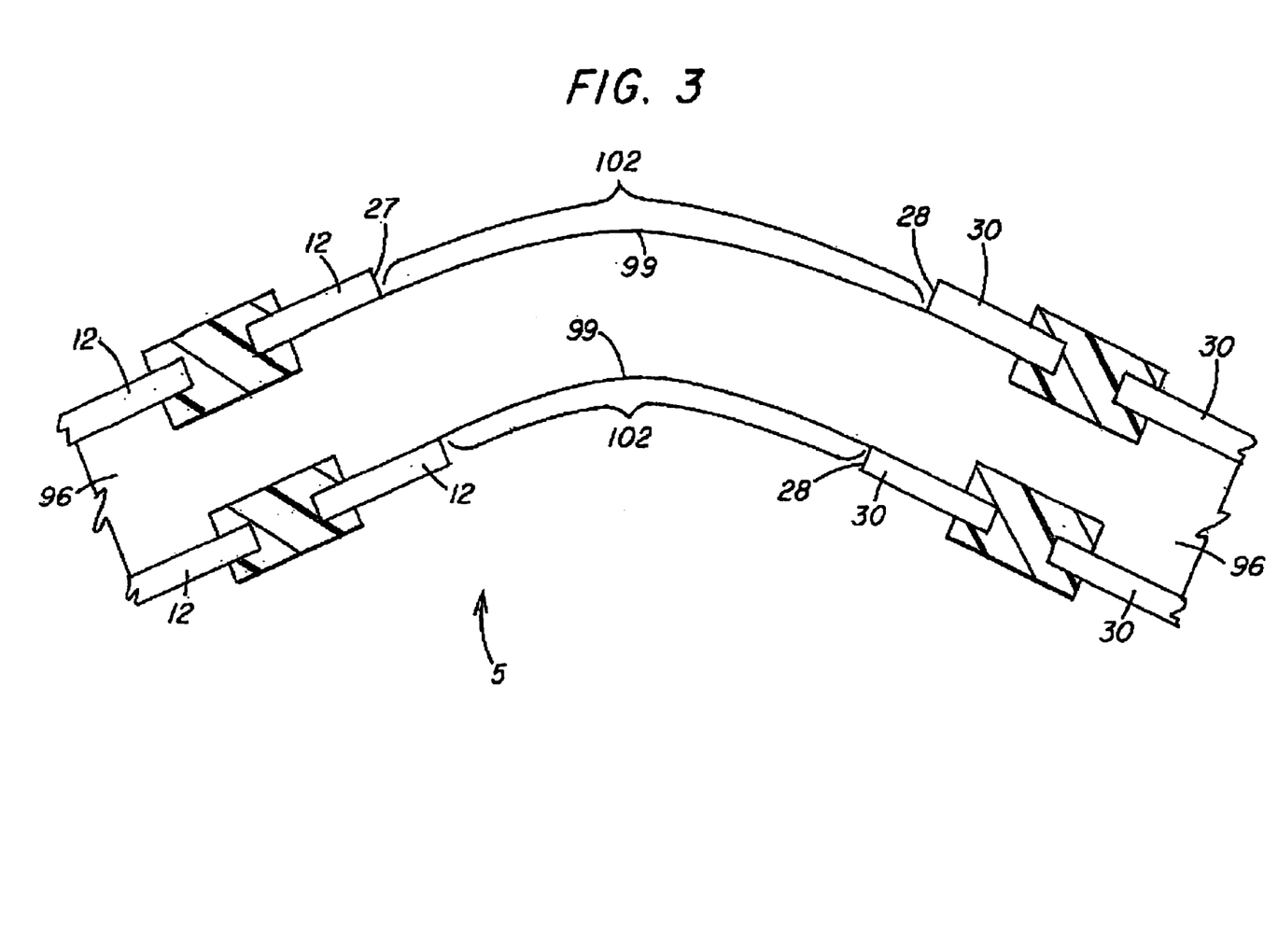
FIG. 3 is a representative sectional view of a tubular assembly similar to that of FIG. 2, in which at least a portion of the plug is fabricated from a flexible material.

At least a portion of the plug of the tubular assembly may be flexible. For example, the plug may provide a flexible connection between the first tube and the second tube in an embodiment of the present invention. With reference to FIG. 3, there is depicted a sectional view of a portion of a tubular assembly 5, in which terminal ends 27 and 28 of first tube 12 and second tube 30, which are superposed over a flexible plug 96, are separated one from the other. Between separated terminal tube ends 27 and 28 of tubes 12 and 30, a portion 102 of exterior surface 99 of plug 96 is exposed. In FIG. 3, plug 96 is reversibly bent along the exposed surface region 102 between terminal ends 27 and 28 of tubes 12 and 30. Plug 96 may be fabricated from flexible materials that are known to the skilled artisan, for example, an elastomeric polymer, such as thermoplastic vulcanizates (e.g., KRATON polymers, commercially available from GLS Corporation) or thermoplastic polyurethanes (e.g., TEXIN thermoplastic polyurethane or DESMOPAN thermoplastic polyurethane, which are commercially available from Bayer Polymers LLC). As used herein and in the claims, the term "flexible" with regard to the plug, refers to a plug at least a portion of which is reversibly bendable. In an embodiment, at least a portion of the plug is fabricated from a plastic material having a flexural modulus of less than 1000 MPa, e.g., less than 100 MPa or less than 70 MPa.

Figure 5:
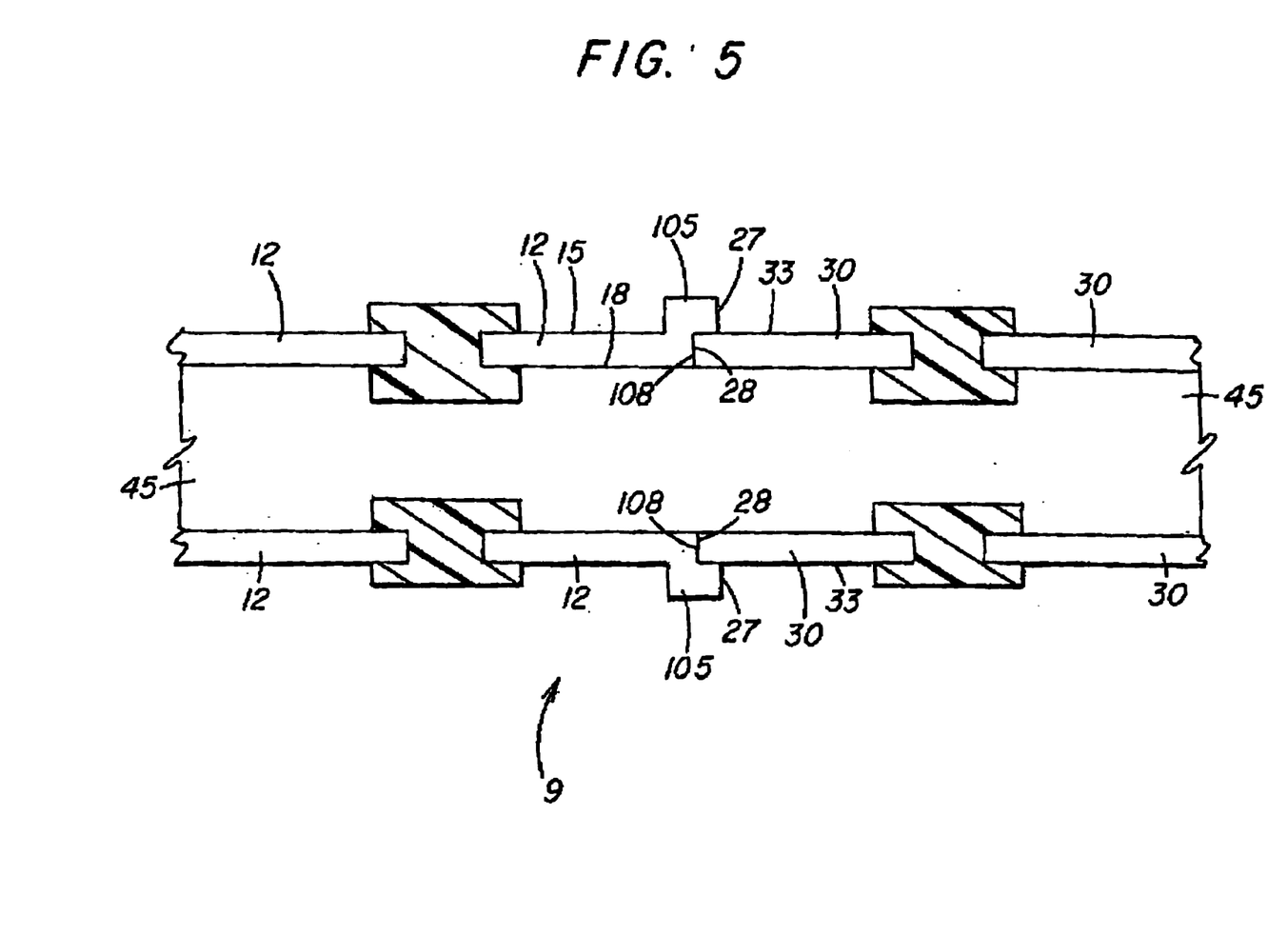
FIG. 5 is a representative sectional view of a tubular assembly similar to that of FIG. 1, in which portion of the inner surface of the first tube is superposed over a portion of the exterior surface of the second tube.

A portion of the inner surface of the first tube may abut a portion of the exterior surface of the second tube, in an embodiment of the present invention. Alternatively, a portion of the exterior surface of the first tube may abut a portion of the interior surface of said second tube. With reference to FIG. 5, a sectional view of a portion of a tubular assembly 9 is depicted, in which a portion of interior surface 18 of first tube 12 abuts a portion of exterior surface 33 of second tube 30. First tube 12 includes a terminal flange 105 which is sized to fittingly receive terminal end 28 of second tube 30. Terminal end 28 of second tube 30 is fittingly received within and abuts annular surface 108 of flange 105. Flange 105 serves to further secure the terminal ends 27 and 28 of first tube 12 and second tube 30 over plug 45.

At least some of the cavities in the exterior surface of the plug may be in the form of annular grooves that are aligned with at least some of the perforations of the first and/or second tubes. Plastic material molded through the perforations of the first and/or second tubes extends into and at least partially fills the annular grooves aligned therewith. Preferably, each of the first tube, second tube and the plug (having annular grooves therein) are substantially cylindrical. When each of the first tube, second tube and the plug are substantially cylindrical, the association between the perforations, the annular grooves and the plastic material extending therethrough and filling thereof allows the first and/or second tubes to be rotatable about the plug. Rotation of the first and/or second tubes about the plug may occur when rotation of the plug is inhibited, for example by externally fixing the plug in place. In addition, the plug may be rotatable within and relative to the first and second tubes, when rotation of the first and second tubes is inhibited relative to the plug.

Figure 6:
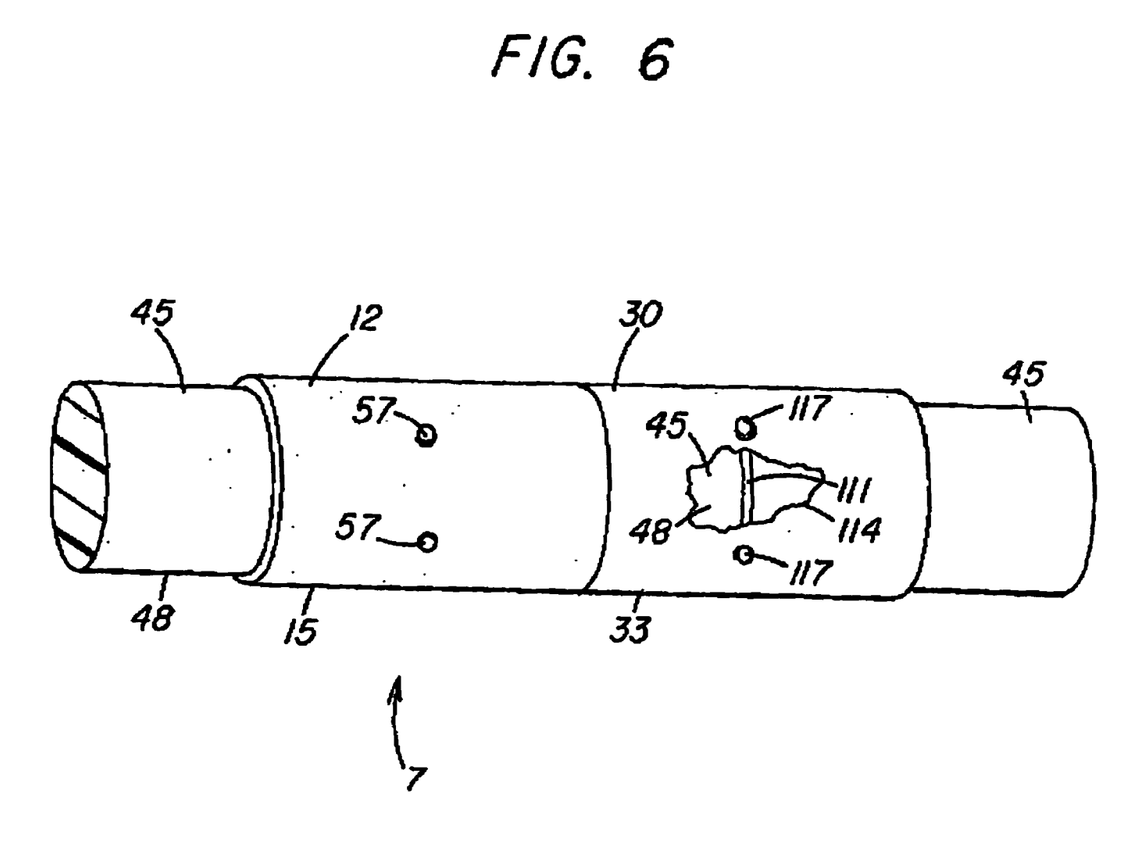
FIG. 6 is a representative perspective view of a portion of a tubular assembly according to the present invention, in which a portion of the second tube is cut-away to reveal an annular groove in the exterior surface of the underlying plug.

With reference to FIG. 6 a perspective view of a portion of a tubular assembly 7 is depicted, which includes a partial cut-away 114 through second tube 30 which reveals an annular groove 111 in exterior surface 48 of plug 45. Each of first tube 12, second tube 30 and plug 45 are substantially cylindrical. The plastic material of attachment heads 117 is continuous with plastic material (not shown) filling annular groove 111. When rotation of plug 45 of FIG. 6 is prevented, second tube 30 may be rotatable about plug 45. If attachment heads 57 of first tube 12 are similarly continuous with plastic material filling an annular groove in the exterior surface 48 of plug 45 aligned therewith (not shown), tube 12 may also be rotatable about plug 45. When attachment heads 57 and 117 are continuous with plastic material filling annular grooves in the exterior surface 48 of plug 45 aligned separately therewith, plug 45 may be rotatable within and relative to tubes 12 and 30.

Rotation of second tube 30 around plug 45 can be enhanced by increasing the lubricity between the plastic material injected into annular groove 111 and the material of plug 45 which defines groove 111 (i.e., the walls of groove 111). Increased lubricity can be achieved by means of appropriate selection of injected plastic material and the material from which plug 45 is fabricated, or by means of introducing a lubricating agent into groove 111 prior to injection of plastic material, as is known to the skilled artisan.

Figure 8:
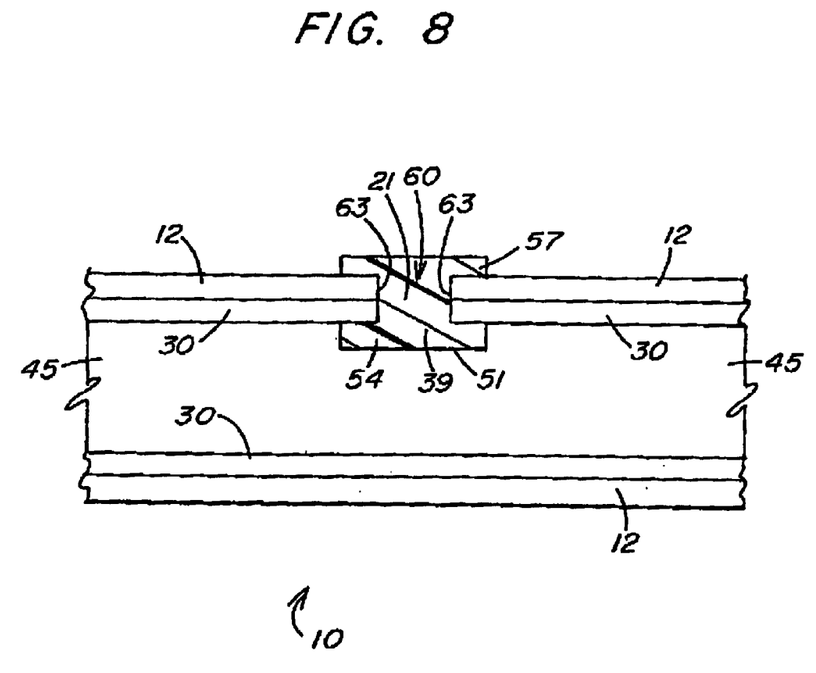
FIG. 8 is a representative sectional view of plastic material molded through a superposed perforation that is superposed over a cavity in the plug.

In an embodiment of the present invention, the tubular assembly is free of plastic material molded through superposed perforations that are superposed over cavities in the plug. Superposed perforations are defined by: (i) perforations of the first tube that are superposed over perforations of the second tube; and/or (ii) perforations of the second tube that are superposed over perforations of the first tube. With reference to FIG. 8, there is depicted a portion of a tubular assembly 10, in which a portion of second tube 30 resides within first tube 12, and perforation 21 of first tube 12 is superposed over perforation 39 of second tube 39, which together define a superposed perforation 60. Superposed perforation 60 is superposed over perforation 51 of plug 45. Plastic material 54 is molded through superposed perforation 60 and into perforation 51. The edges 63 of superposed perforation 60 are embedded in the plastic material extending therethrough.

Tubular assemblies according to the present invention may include superposed perforations (such as superposed perforation 60). For example, the association between terminal end 28 of second tube 30 and flange 105 of first tube 12 of FIG. 5 may include superposed perforations (not shown) which may have fasteners (e.g., rivets) therein (not shown). However, the tubular assemblies of the present invention are preferably free of plastic material molded through superposed perforations 60 that are superposed over cavities 54.

Tubular assemblies according to the present invention may form at least part of tubular frames that are used in a wide variety of applications and markets. For example, the tubular assemblies of the present invention may be used in applications including, but not limited to: chairs, such as aircraft and automotive seats; wheel chairs; walkers (to assist in ambulating); canes; aircraft and automotive space frames; and motorcycle and bicycle frames.

The present invention has been described with reference to specific details of particular embodiments thereof. It is not intended that such details be regarded as limitations upon the scope of the invention except insofar as and to the extent that they are include in the accompanying claims.

What is claimed is:

1. A tubular assembly comprising:
   (a) a first tube having interior arid exterior surfaces and a plurality of perforations having edges;
   (b) a second tube having interior and exterior surfaces and a plurality of perforations having edges; and
   (c) a plug residing within at least a portion of each of said first and second tubes, said plug having an exterior surface, said exterior surface having cavities therein, at least some of said cavities being separately aligned with the perforations of said first tube and the perforations of said second tube,
   wherein said tubular assembly is prepared by a process comprising molding plastic material through at least some of the perforations of said first tube into the cavities aligned therewith, and through at least some of the perforations of said second tube into the cavities aligned therewith, the edges of the perforations of said first and second tubes being embedded in the plastic material extending therethrough thereby fixedly attaching said first tube and said second tube to said plug,
   further wherein each of said first and second tubes have a terminal end superposed over said plug and the terminal ends of said first and second tubes superposed over said plug abut each other.

2. The tubular assembly of claim 1 wherein at least a portion of the interior surfaces of each of said first and second tubes abut at least a portion of the exterior surface of said plug.

3. The tubular assembly of claim 1 wherein at least one of:
   (i) the plastic material extending through the perforations of said first tube and into the cavities aligned therewith is continuous with molded-on attachment heads of plastic material on the exterior surface of said first tube; and
   (ii) the plastic material extending through the perforations of said second tube and into the cavities aligned therewith is continuous with molded-on attachment heads of plastic material on the exterior surface of said second tube.

4. The tubular assembly of claim 1 wherein at least one of:
   (i) the plastic material extending through the perforations of said first tube and into the cavities aligned therewith is continuous with molded-on plastic material encasing at least a portion of the exterior surface of said first tube; and (ii) the plastic material extending through the perforations of said second tube and into the cavities aligned therewith is continuous with molded-on plastic material encasing at least a portion of the exterior surface of said second tube.

5. The tubular assembly of claim 1 wherein each of said first tube, said second tube and said plug are fabricated from a material independently selected from metal, thermoplastic material, thermosetting material and combinations thereof.

6. The tubular assembly of claim 5 wherein said first and second tubes are each independently fabricated from metal, and said plug is fabricated from a material selected from thermoplastic material and thermosetting plastic material.

7. The tubular assembly of claim 1 wherein each of said first tube and second tubs are independently selected from substantially cylindrical tubes, substantially elliptical tubes, polygonal tubes and combinations thereof; and said plug is selected from substantially cylindrical plugs, substantially elliptical plugs, polygonal plugs and combinations thereof.

8. The tubular assembly of claim 7 wherein each of said first and second tubes are substantially cylindrical tubes, and said plug is a substantially cylindrical plug.

9. The tubular assembly of claim 1 wherein said plug is a substantially solid plug.

10. The tubular assembly of claim 1 wherein the plastic; material molded through said perforations and into the cavities aligned therewith is selected from thermosetting material, thermoplastic material and combinations thereof.

11. The tubular assembly of claim 10 wherein the plastic material molded through said perforations and into the cavities aligned therewith is a thermoplastic material selected from the group consisting of thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene and thermoplastic compositions containing one or more thereof.

12. The tubular assembly of claim 10 wherein the plastic material molded through said perforations and into the cavities aligned therewith is reinforced with a material selected from glass fibers, carbon fibers, metal fibers, polyamide fibers and mixtures thereof.

13. The tubular assembly of claim 1 wherein the cavities of said plug are of greater dimension than the perforations of each of said first and second tubes.

* * * * *